(12) United States Patent
Zhang et al.

(10) Patent No.: US 11,350,400 B2
(45) Date of Patent: *May 31, 2022

(54) ACTIVATION OF SECONDARY CELL CONTAINING BANDWIDTH PARTS

(71) Applicant: Apple Inc., Cupertino, CA (US)

(72) Inventors: Yujian Zhang, Beijing (CN); Jeongho Jeon, San Jose, CA (US); Youn Hyoung Heo, Seoul (KR); Candy Yiu, Portland, OR (US); Bharat Shrestha, Hillsboro, OR (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/826,421

(22) Filed: Mar. 23, 2020

(65) Prior Publication Data

US 2021/0014836 A1 Jan. 14, 2021

Related U.S. Application Data

(63) Continuation of application No. 16/142,488, filed on Sep. 26, 2018, now Pat. No. 10,602,506.
(Continued)

(51) Int. Cl.
*H04L 5/00* (2006.01)
*H04W 72/04* (2009.01)
(Continued)

(52) U.S. Cl.
CPC .......... *H04W 72/042* (2013.01); *H04L 5/001* (2013.01); *H04L 5/0053* (2013.01);
(Continued)

(58) Field of Classification Search
CPC ... H04L 5/0001; H04L 5/0003; H04L 5/0005; H04L 5/0007; H04L 5/001;
(Continued)

(56) References Cited

U.S. PATENT DOCUMENTS 10,602,506 B2 * 3/2020 Zhang ............... H04W 72/0453
2018/0183551 A1 6/2018 Chou
(Continued)

OTHER PUBLICATIONS

"3rd Generation Partnership Project; Technical Specification Group Radio Access Network; NR; Medium Access Control (MAC) protocol specification (Release 15)." 3GPP TS 38.321 V15.2.0 (Jun. 2018). 5G. 3GPP A Global Initiative. 6 pages.
(Continued)

*Primary Examiner* — Timothy J Weidner
(74) *Attorney, Agent, or Firm* — Eschweiler & Potashnik, LLC

(57) ABSTRACT

5G methods and architectures to determine active SCells and their bandwidth parts (BWP) used in carrier aggregation (CA) are disclosed in which activating a BWP for an active SCell is performed initially according to a default value provided in initial radio resource control (RRC) messaging. After initialization, SCells and the SCell BWPs used by the user equipment (UE) are activated by RRC messaging, downlink control information (DCI) or dedicated medium access control (MAC) control elements (MAC CEs) with the initial BWP used for an activated SCell being a default value provided during initialization.

13 Claims, 6 Drawing Sheets

Related U.S. Application Data

(60) Provisional application No. 62/564,973, filed on Sep. 28, 2017.

(51) Int. Cl.
  *H04W 72/12* (2009.01)
  *H04W 88/06* (2009.01)
  *H04W 88/10* (2009.01)
  *H04W 92/10* (2009.01)

(52) U.S. Cl.
  CPC .......... *H04L 5/0078* (2013.01); *H04L 5/0098* (2013.01); *H04W 72/0453* (2013.01); *H04W 72/1289* (2013.01); *H04W 88/06* (2013.01); *H04W 88/10* (2013.01); *H04W 92/10* (2013.01)

(58) Field of Classification Search
  CPC .. H04L 5/003–0098; H04W 8/22–245; H04W 36/03–385; H04W 48/08–20; H04W 60/005–06; H04W 72/005–14; H04W 74/002–006; H04W 76/10–38; H04W 88/02; H04W 88/06; H04W 88/08; H04W 88/10; H04W 92/10
  See application file for complete search history.

(56) References Cited

U.S. PATENT DOCUMENTS

| | | |
|---|---|---|
| 2019/0036673 A1 | 1/2019 | Chen |
| 2019/0199503 A1* | 6/2019 | Son .................. H04W 72/0446 |
| 2020/0053613 A1* | 2/2020 | Cirik ................ H04W 72/0453 |
| 2020/0296656 A1* | 9/2020 | Amuru ............... H04W 72/042 |
| 2021/0337444 A1* | 10/2021 | Tang ................ H04W 72/0453 |

OTHER PUBLICATIONS

"5G; NR; Radio Resource Control (RRC); Protocol specification (3GPP TS 38.331 version 15.2.1 Release 15)." ETSI TS 138 331 V15.2.1 (Jun. 2018). Technical Specification. 14 pages.

Notice of Allowance dated Nov. 14, 2019 in connection with U.S. Appl. No. 16/142,488.

3rd Generation Partnership Project; Technical Specification Group Radio Access Network; NR; Medium Access Control (MAC) protocol specification; (Release 15); 3GPP TS 38.321 V0.3.0; Aug. 2017.

3rd Generation Partnership Project; Technical Specification Group Radio Access Network; NR; Medium Access Control (MAC) protocol specification; (Release 15); 3GPP TS 38.321 V1.0.0; Sep. 2017.

3rd Generation Partnership Project; Technical Specification Group Radio Access Network; NR; Radio Resource Control (RRC); Protocol specification (Release 15); 3GPP TS 38.331 V0.1.0; Oct. 2017.

3rd Generation Partnership Project; Technical Specification Group Radio Access Network; NR; Radio Resource Control (RRC); Protocol specification (Release 15); 3GPP TS 38.331 V0.0.5; Aug. 2017.

* cited by examiner

Example Activation of SCell and BWP

LTE Activation/Deactivation MAC Control Element of One Octet

ACTIVATION OF SECONDARY CELL CONTAINING BANDWIDTH PARTS

CROSS-REFERENCE TO RELATED APPLICATIONS

This application is a continuation of U.S. patent application Ser. No. 16/142,488 filed Sep. 26, 2018, which claims benefit of priority under 35 U.S.C. 119(e) to U.S. Application Ser. No. 62/564,973 filed on Sep. 28, 2017, under the same title by the same inventors as the subject application, and is incorporated herein by its reference.

BACKGROUND

Embodiments of the present invention relate generally to wireless communications, and more particularly, but not limited to, new types of communication formats and protocols for use in next generation wireless networks.

The fifth generation of mobile technology (5G) is positioned to address the demands and business contexts of 2020 and beyond, that is, to enable a fully mobile and connected society. Long Term Evolution (LTE) and New Radio (NR) systems are two terms relating to 5G development and are used interchangeably herein, and may include Carrier Aggregation (CA), where two or more Component Carriers (CCs) are aggregated in order to support wider transmission bandwidths. Secondary Cells (SCells) can be configured to form, together with a Primary Cell (PCell), a set of serving cells. To enable reasonable user equipment (UE) battery consumption when CA is configured, an activation/deactivation mechanism of SCells is supported with Media Access Control (MAC) Control Element (CE) signaling.

The 3GPP 5G Release 15 Technical Specification (TS) 38.331, titled: "NR; Radio Resource Control (RRC); Protocol specification," published as ETSI TS 138 331 V15.2.1 (2018-06), and its content fully incorporated herein by its reference, provide details of new features in NR CA.

Radio resource control (RRC) is responsible for various control signaling including, connection control, initial security activation, radio configuration control including e.g. assignment/modification of ARQ configuration, HARQ configuration, DRX configuration, establishment/modification/release of radio bearers carrying user data (DRBs); and in case of CA, cell management including e.g. addition/modification/release of SCell(s), among others.

One new feature of NR CA includes the use of a Bandwidth Part (BWP), which is a mechanism to adaptively adjust UEs' operating bandwidth, where a UE is not required to transmit or receive outside of the configured frequency range of the active BWP, with an exception of measurement gap. The BWP is a frequency resource that the UE may use to receive and/or transmit; for example, a physical downlink shared channel (PDSCH)/physical uplink shared channel (PUSCH) may be scheduled within an active BWP. One BWP is limited to one cell, and Multiple BWPs may be configured per cell. For a UE in RRC connected state ("RRC_CONNECTED" state), an "active" BWP is the BWP presently used for transmission/reception. The number of BWPs are configured via the RRC, and only one BWP is selected as an active BWP, by using RRC signaling or via PDCCH/DCI signaling.

If a SCell utilizing BWPs is activated, a mechanism is needed to indicate which BWP is being activated. One solution is to first activate an SCell with MAC CE signaling, then use PDCCH/DCI signaling to specify the active BWP. However, a disadvantage of this solution is that it will require two separate steps/operations in time, which may cause additional latency for SCell with BWP activation. Embodiments of the present invention relate to various solutions for activating and/or deactivating SCells and their BWP with a lower latency than two sequentially performed steps, and with minimal complexity.

BRIEF DESCRIPTION OF THE DRAWINGS

Certain circuits, logic operation, apparatuses and/or methods will be described by way of non-limiting example only, in reference to the appended Drawing figures in which.

DETAILED DESCRIPTION

Figure 1:
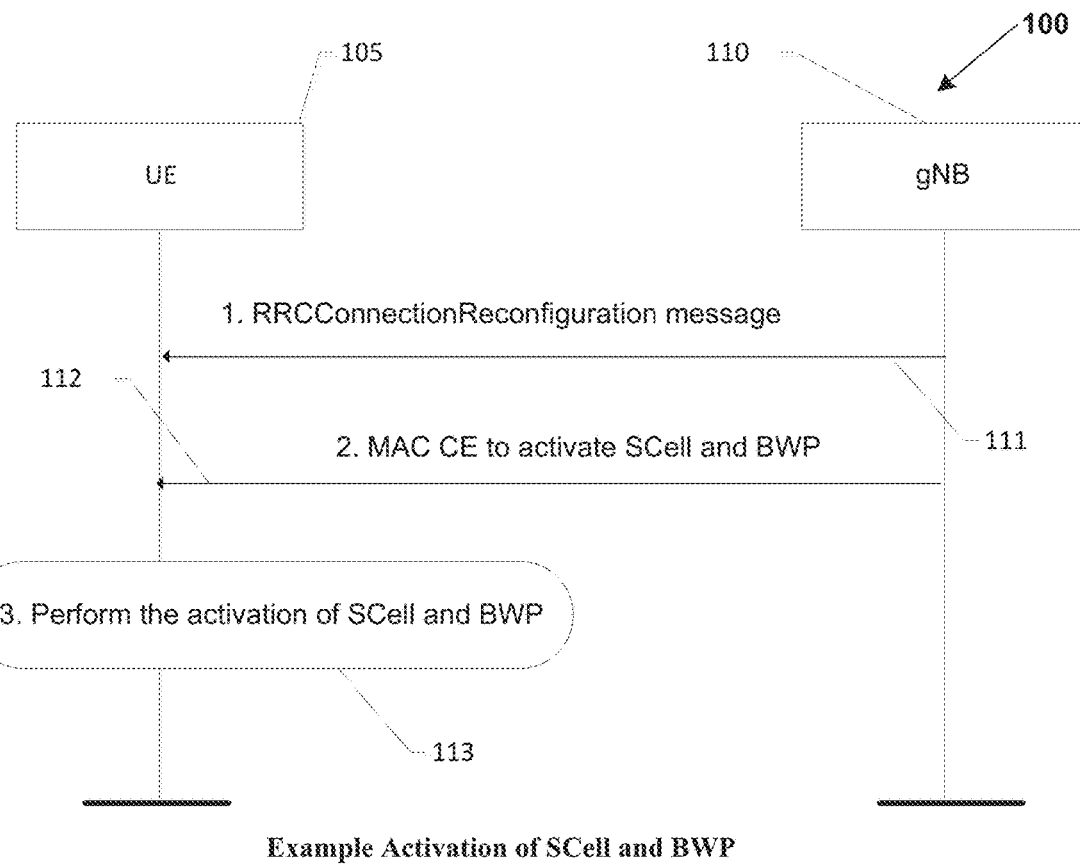
FIG. 1 depicts an example procedure to activate secondary cell (SCell) and bandwidth part (BWP) in accordance with embodiments of the present disclosure.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the aspects of the various embodiments may be practiced in other examples that depart from the specific details discussed herein. In certain instances, descriptions of well-known devices, circuits, and methods are omitted so as not to obscure the description of the various embodiments with unnecessary detail.

According to various embodiments herein, the network (e.g., a Radio Access Network (RAN) node such as a next generation NodeB (gNB) or the like, generically referred to herein as "gNB") may activate an SCell with at least one bandwidth part (BWP) using a RRC configuration message, a single MAC CE signaling opportunity, a RRC reconfiguration message or in downlink control information (DCI). The various embodiments disclosed herein minimize the latency of activating a SCell with BWP, and hence reduce the delay of data services. The SCell and its BWP(s) may be initially configured via BWP information elements (IEs) present in the RRC configuration message. An initialization of SCells and corresponding BWPs available for each SCell are provided the UE in the RRC configuration signaling.

A BWP is a group of contiguous physical resource blocks (PRBs) and the bandwidth of a BWP cannot exceed the configured component carrier bandwidth for the UE. Each BWP is associated with a specific numerology, i.e., subcarrier spacing (SCS) and cyclic prefix (CP) type. Therefore, the BWP is also a means to reconfigure a UE with a certain transceiver numerology. A network can configure multiple BWPs to a UE via Radio Resource Control (RRC) signaling, which may overlap in frequency. The granularity of bandwidth configuration is one physical resource block (PRB). For each serving cell, DL and UL BWPs are configured separately and independently for paired spectrum and up to four BWPs can be configured for DL and UL each. For unpaired spectrum, a DL BWP and a UL BWP are jointly configured as a pair with up to four pairs configured. There can be maximally four UL BWPs configured for a supplemental UL (SUL) as well. Each configured DL BWP includes at least one control resource set (CORESET) with UE-specific search space (USS). The USS is a searching space for the UE to monitor possible reception of control information destined for the UE. In the primary carrier, at least one of the configured DL BWPs includes one CORESET with common search space (CSS). The CSS is a searching space for UE to monitor possible reception of control information common for all UEs or destined for the particular UE. If the CORESET of an active DL BWP is not configured with CSS, the UE is not required to monitor it. As mentioned, UEs are expected to receive and transmit only within the frequency range configured for the active BWPs with the associated numerologies, with certain exceptions, such as a UE may perform Radio Resource Management (RRM) measurement or transmit sounding reference signal (SRS) outside of its active BWP via a measurement gap. The numerology of the DL BWP configuration is used at least for the Physical Downlink Control Channel (PDCCH), Physical Downlink Shared Channel (PDSCH) and corresponding demodulation RS (DMRS). Likewise, the numerology of the UL BWP configuration is used at least for the Physical Uplink Control Channel (PUCCH), Physical Uplink Shared Channel (PUSCH) and corresponding DMRS.

Activation and deactivation of BWP may be performed via dedicated RRC messages and downlink control information (DCI) may additionally provide SCell and BWP activation/deactivation. Another possibility is activation based on MAC Control Element (MAC CE) signaling as discussed in embodiments below and the activation/deactivation of DL BWP (or DL/UL BWP pair for the case of unpaired spectrum) by means of timer is also proposed.

In UMTS, only RRC and NAS messaging are used in communication between UE and Network, but in LTE/NR, there are several communication paths at the MAC layer. It implies that there are special MAC structures that carry special control information. These special MAC structures carrying the control information are called 'MAC CE', which means 'MAC Control Element'. This special MAC structure is implemented as a special bit string in the logical channel ID (LCID) field of a MAC header. There are several MAC CE in downlink MAC and also several MAC CE in uplink MAC defined in 38.321 Rel 15-6.1.3 MAC Control Elements. An LCID of '111000' and '111010' are used for SCell activation and deactivation using 4 octet or 1 octet MAC CEs, respectively.

With the timer element approach, if a UE is not scheduled for a certain amount of time, i.e., expiration of timer, the UE switches its active DL BWP (or DL/UL BWP pair) to the default one, i.e., the initial BWP used by a UE. There is an initial active BWP for a UE assigned during initial access until the UE is explicitly configured with BWPs during or after RRC connection establishment. The initial active BWP is the default BWP, unless configured otherwise. In Release 15, for a UE, there is at most one active DL BWP and at most one active UL BWP. The HARQ retransmission across different BWPs is supported when a UE's active BWP is switched.

Activation of SCell and BWP

The following description details potential approaches in activating BWP with a SCell. In certain embodiments, a single MAC CE signal may be used to activate both an SCell, and the BWP within the SCell. Referring to FIG. 1, a high-level procedure 100 for activation of a SCell and BWP is shown. Method 100 of various embodiments generally includes three basic events in activating the SCell and an associated BWP for uplink/downlink communications.

A gNB 110 sends 111 a RRC message to a carrier aggregation (CA) enabled UE 105 to perform some behavior (e.g., add/activate/select) to a SCell. In various embodiments, this may be done by sending 111 an "RRCConnectionReconfiguration" message to UE 105 that contains the information, e.g., the frequency, bandwidth, and various radio configurations, for the SCell. In one embodiment, the RRC message also contains the information for the one or more BWPs the SCell may utilize for communications between the SCell and UE 105, e.g., the numerology and frequency domain information of the BWP(s) for each SCell. Note that a single RRC message can add one or more SCells, and the message can also be used to remove SCell(s). Depending on the different embodiments, the information for BWP(s) signaled in the RRC message may vary.

The second event is for the gNB 110 to, nearly concurrently, send 112 a MAC CE to activate the SCell and the BWP assigned the SCell. The format of the MAC CE may vary as discussed in embodiments below. The third event comprises the UE 105 activating 113 the SCell and BWP based on the configuration in the received RRC message and the activation signaling in the MAC CE. In addition to the activation/deactivation of SCells and BWPs, the MAC CE can be also used to switch the active BWP of already activated SCells. This event is optional as the RRC message may activate the SCell and BWP itself.

In a first embodiment, the RRC message adding the SCell includes a configuration for one or more BWPs and an associated BWP index. In the MAC CE for SCell activation, the SCell information and BWP information including BWP index indicators are included to activate the BWP within the SCell. One example of the SCell configuration that may be included in RRC signaling for above referenced 3GPP TS 38.331 is shown by Table 1 below. For illustration purpose only, it is assumed that when an SCell is added, the SCellConfig information element (IE) is used, which includes the sCellConfigDedicated IE. In this embodiment, the sCellConfigDedicated IE includes the configuration for the bandwidth part in the bandwidthParts IE. According to various embodiments, the bandwidthPartIndex IE may be added within the BandwidthPart IE, and the index is unique to a SCell. In the example below, it is shown that the index is 1 based, but it is also possible that the index is 0 based.

TABLE 1

```
SCellConfig ::=                    SEQUENCE {
    sCellIndex                         SCellIndex,
    sCellConfigCommon                  ServingCellConfigCommon
                                       OPTIONAL, -- Cond SCellAdd
    sCellConfigDedicated               ServingCellConfigDedicated
                                       OPTIONAL, --Cond SCellAddMod
}
ServingCellConfigDedicated ::=     SEQUENCE {
    -- L1 parameters :
    bandwidthParts                     SEQUENCE (SIZE (1..maxNrofBandwidthParts)) OF
    BandwidthPart                          OPTIONAL,
    ...                                OPTIONAL, -- Cond SCell
}
BandwidthPart ::=                  SEQUENCE {
    bandwidthPartIndex                 INTEGER (1.. maxNrofBandwidthParts),
    downlink                           DirectionalBandwidthPart
        OPTIONAL,
    uplink                             DirectionalBandwidthPart
            OPTIONAL, -- Cond InterFreqHOAndUplinkSCellAdd
}
```

Figure 2:
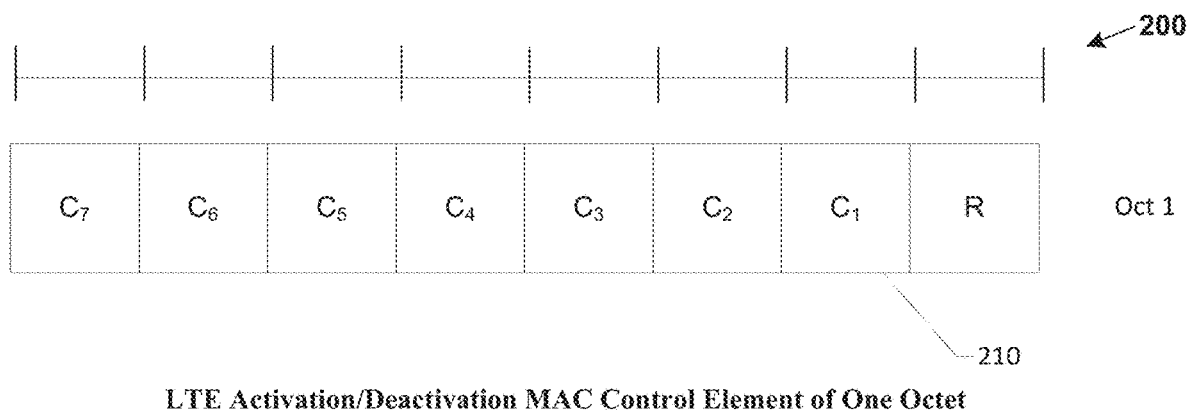
FIG. 2 depicts an example of a media access control (MAC) control element (CE) of one octet used for SCell and BWP activation/deactivation in accordance with some embodiments of the invention.

In LTE, an Activation/Deactivation MAC Control Element can be either of single octet or four octet. FIG. 2 shows an example of an LTE single octet MAC CE 200 utilized in various embodiments. With the single octet MAC CE 200, up to seven SCells can be activated/deactivated. With a four octet MAC CE, up to thirty-one SCells can be activated/deactivated. In example embodiments, the Ci field 210 is set to "1" to indicate that the SCell with SCeCellIndex i shall be activated. The Ci field 210 is set to "0" to indicate that the SCell with SCeCellIndex i shall be deactivated.

In certain embodiments, to activate a BWP within the SCell, a bandwidth part index is included for the activated SCell. Two embodiments are described below for a SCell with BWP Activation/Deactivation MAC CE. For illustration purpose, only the case of maximum seven SCells are described, though it is straightforward to extend the embodiments to other numbers of SCells. In the MAC CE formats described, it is assumed that there are maximum four BWPs per SCell, therefore 2-bits are used to indicate the BWP index. It is also straightforward to vary the number of bits for the BWP index if to the maximum number of BWPs is larger or smaller. The examples also assume that only one BWP is active within one SCell, though the embodiments may be extended so that multiple BWPs are activated within an SCell.

Figure 3:
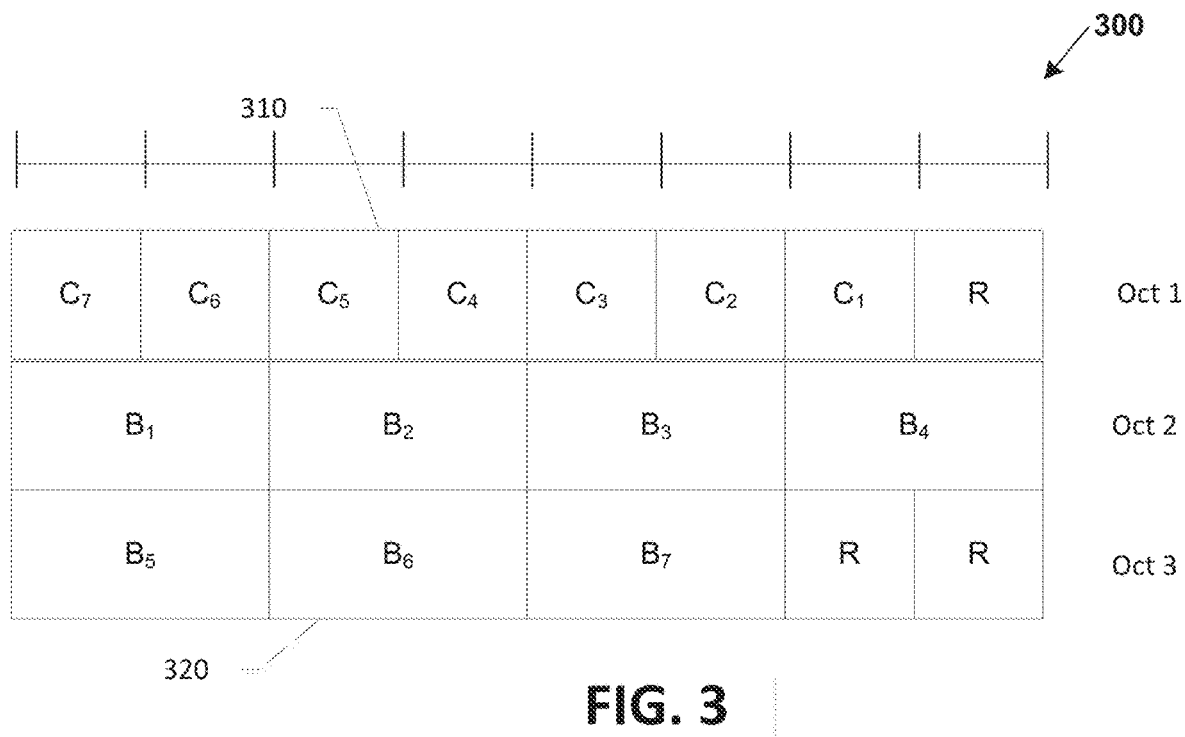
FIG. 3 depicts an example of fixed size MAC CE SCell and BWP activation/deactivation in accordance with some embodiments.

Option 1: in this option, the size of MAC CE 300 is fixed. As shown by FIG. 3, fields Bi 320 are used to indicate the BWP index, and the number of Bi fields 320 (seven are shown in FIG. 3) is the same as the number of the Ci field 310 (indicating the SCell index). In this embodiment, there is a one-to-one mapping between the field for Ci 310 and fields for Bi 320, i.e. the BWP index indicated in field Bi 320 corresponds to the SCell Ci 310. In case the SCell Ci 310 is deactivated, e.g., has a '0' value, the corresponding field for Bi 320 is simply ignored.

Figure 4:
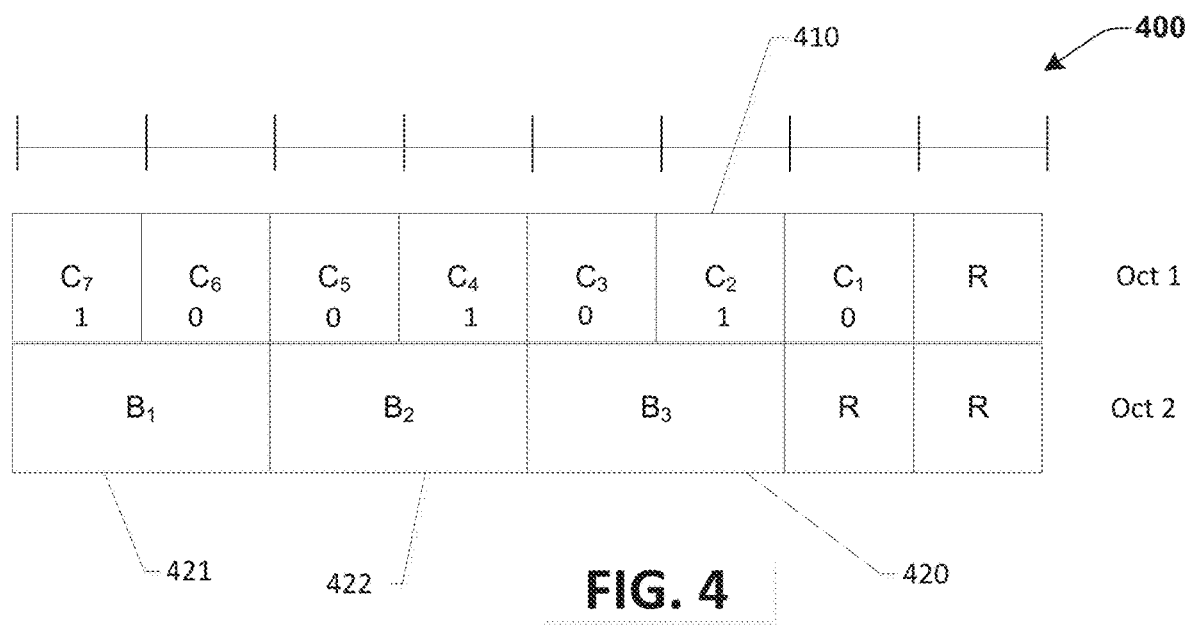
FIG. 4 depicts an example of variable size Activation/Deactivation MAC CE in accordance with some embodiments.

Option 2: in this option, referring to FIG. 4, the size of MAC CE 400 is variable. Bi fields 420 are used to indicate the BWP index (hence, "Bi"). BWP index indicated in field B1 421 corresponds to the first SCell activated (i.e. the smallest i with the Ci field 410 set to "1"), BWP index indicated in field B2 422 corresponds to the second SCell activated, and so on. In FIG. 4, there are three Ci fields 410 set to "1" (e.g., C2, C4, C7), and three Bi fields. Then field B1 is used to activate the BWP with sCellIndex 2, field B2 is used to activate the BWP with sCellIndex 4, and field B3 is used to activate the BWP with sCellIndex 7. Since the size of MAC CE 400 is variable, corresponding MAC subheader should include F field and L field to indicate the size of the MAC CE.

In a different embodiment, one BWP within an SCell may be activated without explicit fields in MAC CE signaling as those described previously. In this case, the BWP could be one of 1) a pre-defined BWP set in standards, 2) initial BWP in broadcast signaling, and/or 3) indicated explicitly in RRC signaling. This is then considered a default BWP.

One example of the RRC signaling for 3GPP TS 38.331 is shown in Table 2 below. Similar to the prior embodiment of RRC signaling, for illustration purpose only, it is assumed that when a SCell is added, IE SCellConfig is used, which includes IE sCellConfigDedicated. The IE sCellDedicated includes the configuration for the bandwidth part in IE bandwidth Parts.

In this embodiment, there are two options to indicate the BWP for SCell activation:

Option 1: which bandwidth part to be activated during SCell activation is explicitly signaled. As shown in ASN.1 code of Table 2, a Boolean value active is signaled for each bandwidth part and the value "true" indicates the corresponding BWP is activated when the SCell is activated. Note that to avoid multiple BWPs to activate at the same time, only one BWP can be set with value "true."

Option 2: the first signaled bandwidth part is the bandwidth part to be activated when SCell is activated. In this option, there is no need to signal a Boolean value active as in option 1.

When an SCell is added, it is done by a reconfiguration and sync using the RRC messaging. The fields are updated with ID of an SCell and the UL and DL BWPs associated with each SCell. Messaging is used which identifies the BWP to be activated upon performing the reconfiguration. If the field is absent, the RRC reconfiguration does not impose a BWP switch.

On the addition or activation of a SCell, the DL BWP and UL BWP indicated by firstActiveDownlinkBWP-Id and firstActiveUplinkBWP-Id, respectively is active without receiving PDCCH indicating a downlink assignment or an uplink grant. The BWP identifications may be as follows:

First active downlink BWP-ID: If configured for an SCell, this field contains the ID of the downlink bandwidth part to be used upon MAC-activation of an SCell. The initial bandwidth part is referred to by BWP-Id=0.

First active uplink BWP-ID: If configured for an SpCell, this field contains the ID of the DL BWP to be activated upon performing the reconfiguration in which it is received. If the field is absent, the RRC reconfiguration does not impose a BWP switch (corresponds to L1 parameter 'active-BWP-UL-Pcell'). If configured for an SCell, this field contains the ID of the uplink bandwidth part to be used upon MAC-activation of an SCell. The initial bandwidth part is referred to by BandwidthPartId=0.

TABLE 2

```
SCellConfig ::=                    SEQUENCE {
    sCellIndex                         SCellIndex,
    sCellConfigCommon                  ServingCellConfigCommon
                                           OPTIONAL, -- Cond SCellAdd
    sCellConfigDedicated               ServingCellConfigDedicated
                                           OPTIONAL, -- Cond SCellAddMod
}
ServingCellConfigDedicated ::=     SEQUENCE {
    -- L1 parameters:
    bandwidthParts                     SEQUENCE (SIZE (1..maxNrofBandwidthParts)) OF
    BandwidthPart                          OPTIONAL,
    ...                            OPTIONAL, -- Cond SCell
}
BandwidthPart ::=                  SEQUENCE {
    active                             BOOLEAN,
    downlink                           DirectionalBandwidthPart
        OPTIONAL,
    uplink                             DirectionalBandwidthPart
            OPTIONAL, -- Cond InterFreqHOAndUplinkSCellAdd
}
```

The Activation/Deactivation MAC Control Element can reuse the LTE format. For illustration purpose, if there are maximum 7 SCells, the LTE MAC CE format as shown in FIG. 2 can be used. It is straightforward to extend the invention to other number of SCells. For any SCell activated with the MAC CE, the corresponding default BWP associated with the SCell is then activated.

In this embodiment, an example change to 3GPP TS 38.321 section 5.9 (Activation/Deactivation of SCells) is shown by Table 3 below, with the change underlined.

TABLE 3

The MAC entity shall for each NR-UNIT and for each configured SCell:
  1> if an SCell Activation/Deactivation MAC CE is received in this NR-UNIT activating the SCell:
    2> activate the SCell;
    2> <u>if bandwidth parts are configured by RRC, activate the configured bandwidth part;</u>
    2> start or restart the sCellDeactivationTimer associated with the SCell.

In yet another alternate embodiment, the activation of BWP can be controlled with a timer. For example, a timer starts when a BWP is activated with downlink control information (DCI) and upon the expiry of the timer, the UE goes back to default BWP. The timer may also be considered useful with SCell deactivation/activation.

In a first example of this embodiment, a timer is not affected by SCell deactivation/activation. In this case, when an SCell is activated, if the timer is still running with the previously activated BWP, the UE assumes and utilized the previously activated BWP. If the timer is not running, the UE assumes the default BWP as the active BWP.

In a second example of this embodiment, a timer is expired (stopped) upon SCell deactivation. In this case, the UE assumes the default BWP as the active BWP when the corresponding SCell is activated later.

In yet another embodiment of the disclosure, in some cases, a timing ambiguity issue can occur during RRC reconfiguration. It is assumed that BWP can be activated with RRC signaling. The main motivation is to reduce interruption time to activate BWP for downlink control information (DCI) signaling after RRC reconfiguration. However, the exact timing of RRC reconfiguration is not so clear because of RRC processing delay (e.g., 15 ms/20 ms in LTE). Thus it may be desirable to have a more clear and defined timing boundary to apply the new active BWP if it is indicated by RRC signaling.

For a first approach the uplink (UL) BWP may include a new active UL BWP applied for the first uplink transmission (e.g., scheduling request (SR), PUCCH, sounding reference signal (SRS)) after RRC connection reconfiguration is received. For downlink (DL) BWP of the first approach, the new active DL BWP is applied when UL BWP is changed to new active UL BWP.

In a second approach, the DL BWP may include the UE changing to the new active DL BW immediately when RRC reconfiguration is processed. For UL BWP of the second approach, the UE changes to a new UL DL BWP when the UE receives correct DCI in the active DL BWP.

For a third approach, the DL BWP may include the UE changing to the new active DL BW immediately when RRC reconfiguration is processed. For UL BWP of the third approach, the new active UL BWP is applied for the first uplink transmission (SR, PUCCH, SRS) after RRC connection reconfiguration is received.

Figure 5:
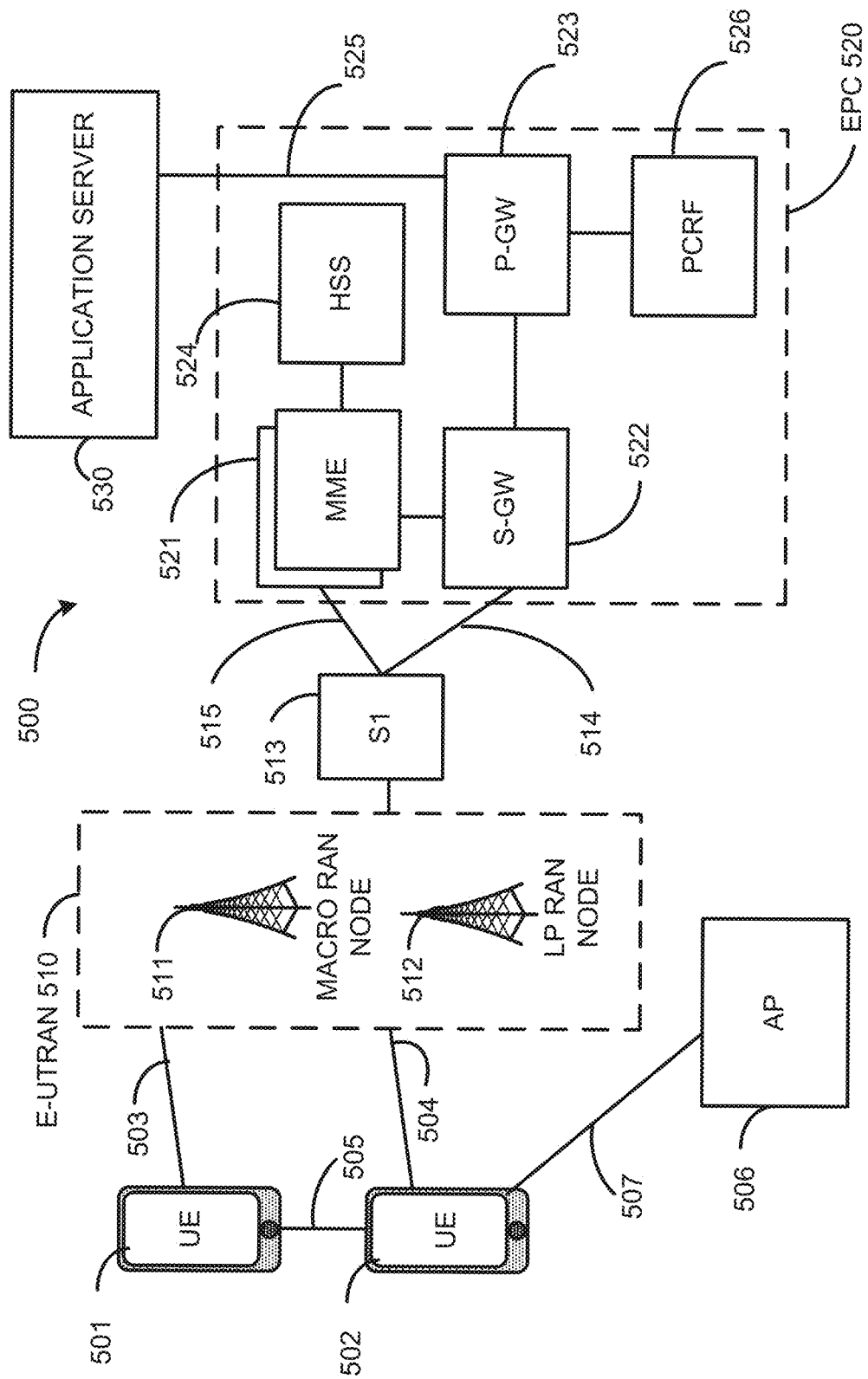
FIG. 5 depicts an architecture of a system of a network in accordance with some embodiments.

FIG. 5 illustrates an architecture of a system 500 of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling via a 3GPP Long Term Evolution (LTE) protocol and a New Radio (NR) protocol.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with RAN nodes, e.g., gNBs 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMEs 521.

In this embodiment, the CN 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network 523 and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
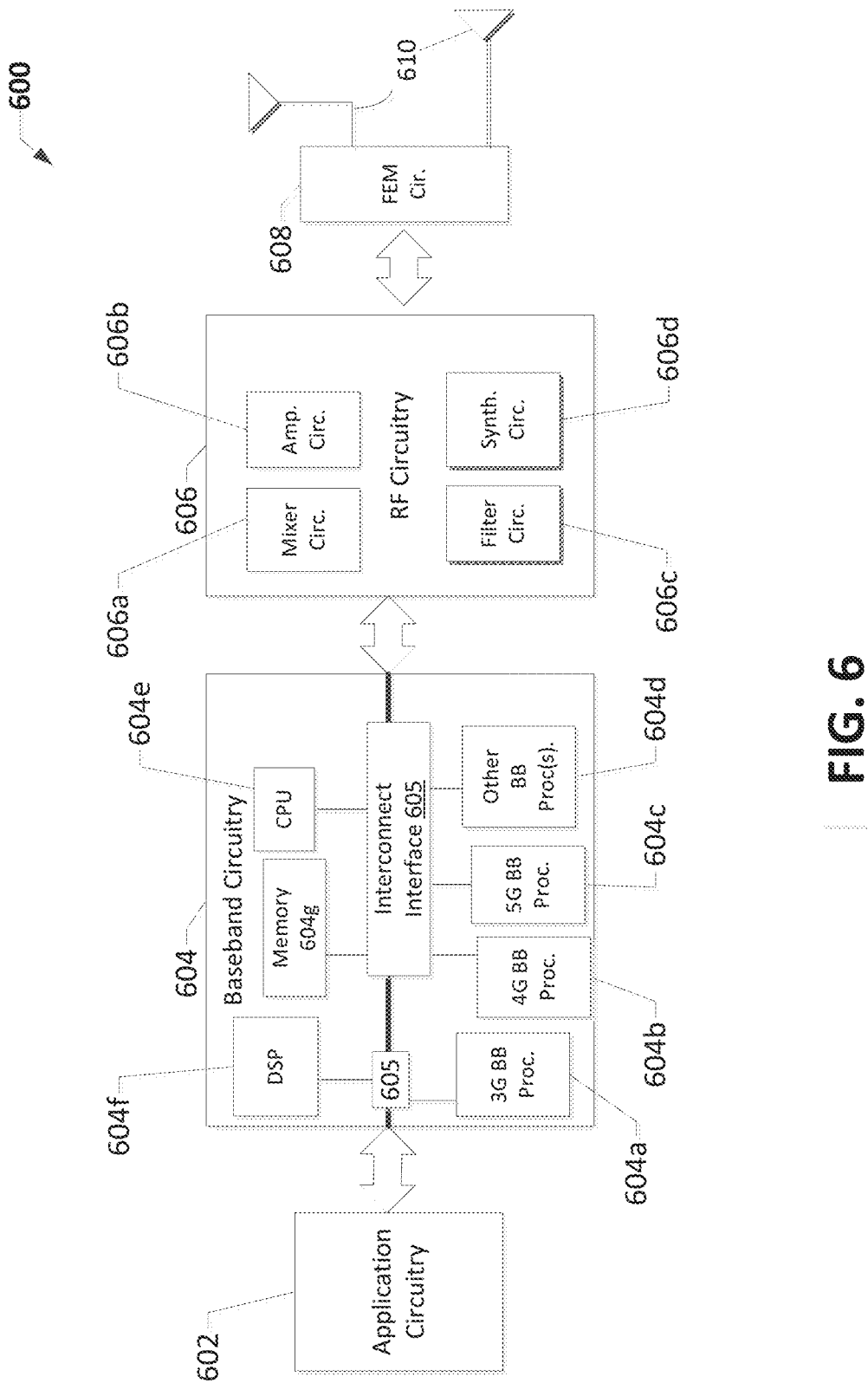
FIG. 6 depicts example components of a device in accordance with some embodiments.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include less elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuity 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) may handle various radio control functions, e.g., RRC connection management messaging used to activate SCells and BWPs as in the embodiments above. BB circuitry 604 enables communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics. PMC 612 may also provide power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC_Connected state in which CA information may be provided to the UE.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
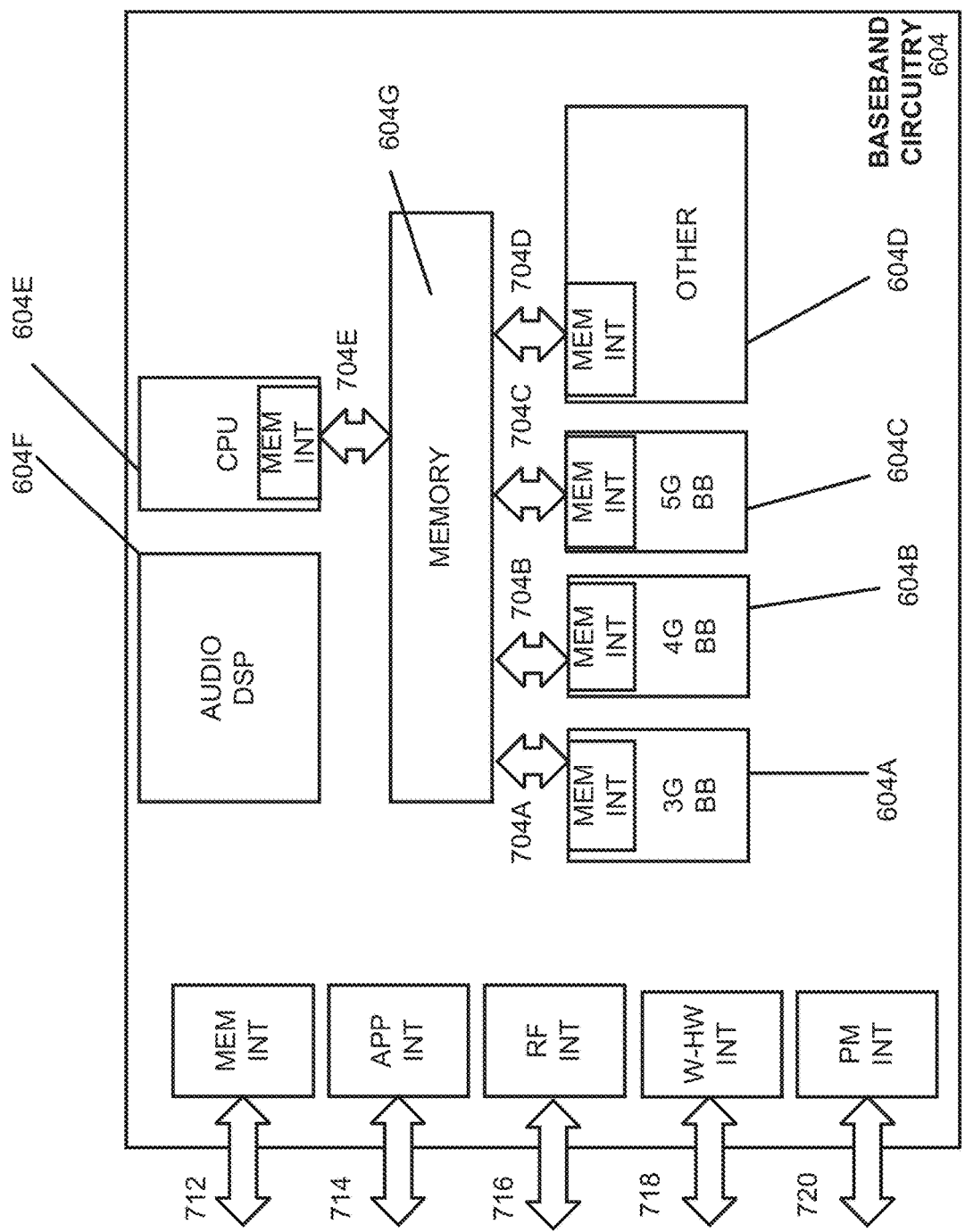
FIG. 7 depicts example interfaces of baseband circuitry that can be employed in accordance with some embodiments.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6, an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
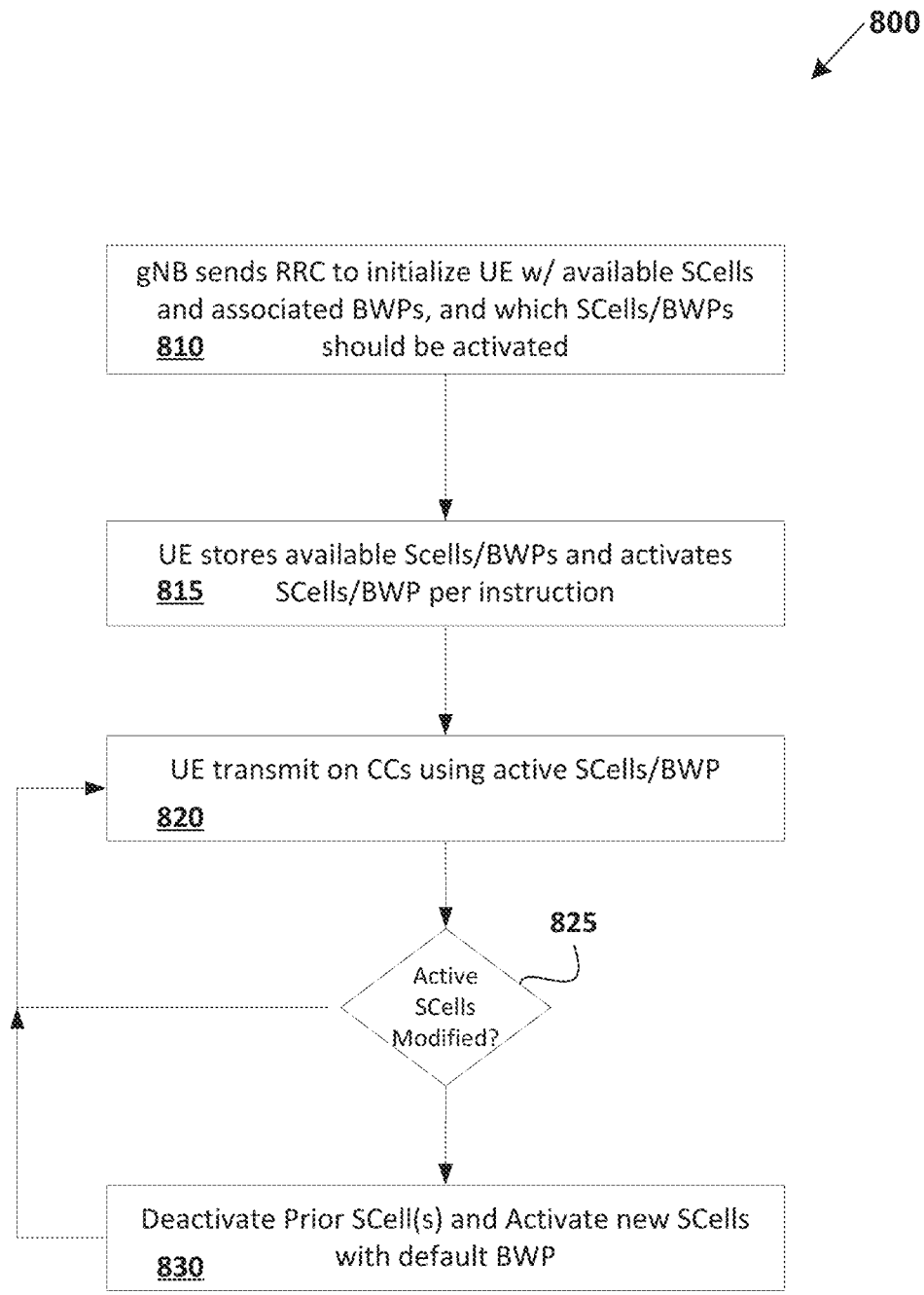
FIG. 8 shows an example flow diagram of a method of controlling Carrier Aggregation (CA) activation and deactivation SCells and their associated BWP(s) according to certain embodiments of the invention.

Referring to FIG. 8, an example method 800 for configuration of carrier aggregation (CA) SCells and BWPs in a new radio (NR) network is described. It is noted that certain portions of method 800 are referenced in respect to operation from a network device perspective (e.g., gNB of network 500 in FIG. 5) and other portions of method 800 from the mobile device perspective (e.g., 600 in FIG. 6). Accordingly, various steps will be performed by a mobile device/UE and others performed by the network device/gNB and messages/signaling sent by one, are inherently received by the other without explicit description of the same. And, to the same perspective, either device is configured to perform the actions recited, by way of circuits, processors and logic resident in the corresponding device.

Method 700 begins by a network node, (e.g., gNB 110) transmitting (and the UE 105 receiving) 810 a radio resource control (RRC) BWP configuration message/signal. The RRC_config message identifies for each UE, the SCells available and the bandwidth parts (BWPs) associated with each SCell. The UE stores 815 the SCell and BWP information, preferably in the form of an index.

The UE will activate 820 one or more SCells and its BWP according to any of the embodiments disclosed herein though timing of activation of an SCell may determine how they are activated. For example, during UE first connection, it will receive RRC signaling for connection and configuration. At that point SCells and the BWP to be used may be activated by the RRC messaging at the same time the available SCells and BWPs are initially identified.

Hereafter, the UE may be instructed to change 825 the active SCell and/or the active BWP from a gNB by way of RRC configuration message, downlink control information (DCI) or dedicated MAC CE signaling. If the same or previously used SCell is activated, the UE will use the initial BWP assigned. Alternatively, in other embodiments, the UE may be signaled which BWP to activate as disclosed in embodiments above. The UE then activates 830 the new SCell or BWP as instructed.

As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more." "Interface" may simply be a connector or bus wire through which signals are transferred, including one or more pins on an integrated circuit.

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

Example Embodiments

An apparatus in a First Example embodiment, a user equipment (UE) communication device to communicate in a wireless network capable of carrier aggregation (CA) is defined which includes: a one or more memories; and a baseband processing circuit including one or more processors accessing the one or more memories and configured to select an active secondary serving cell (SCell) for CA, and an active bandwidth part (BWP) for communications with the selected active SCell, the active SCell and active BWP selected based, at least in part, on an initialization signaling received from a remote network access station, wherein after initialization signaling the one or more processors are configured to subsequently select the same active SCell or a different active SCell from a subsequent reconfiguration message received from the remote network access station, and use an active BWP for communications with the subsequently selected active SCell from information present in the initialization signaling originally received.

In a Second Example, the First Example is furthered by a radio resource configuration (RRC) message providing both the initialization signaling and the subsequent reconfiguration message.

In a Third Example, the First Example is furthered by the subsequent reconfiguration messaging adding one or more additional available SCells and a corresponding default BWP to use when the one or more additional available SCells are activated.

In a Fourth Example, the First Example is furthered by the initialization signaling being provided from a next generation NodeB (gNB) in a radio resource configuration (RRC) message.

In a Fifth Example, the First Example is furthered by the active SCell and active BWP being changed by a medium access control (MAC) control element (MAC CE) message.

In a Sixth Example, the Fifth Example is furthered the active SCell and active BWP being changed by a reconfiguration message identifying a new active SCell, and wherein a new active BWP is selected from a default first active BWP identification value present in the initialization signaling.

In a Seventh Example, the First Example is furthered by a BWP index being included in the initialization signaling.

In an Eighth Example, the Fifth Example is furthered by the MAC CE being a fixed size and includes BWP index fields and SCell index fields.

In a Ninth Example, the Fifth Example is furthered by the MAC CE being of variable size and including a BWP index fields and SCell index fields.

According to a Tenth Example embodiment, a user equipment (UE) enabled for carrier-aggregation communication with primary cells (PCells) and secondary cells (SCells) includes: a memory coupled to the one or more processors to store information relating to potential SCells available, including at least one bandwidth part (BWP) associated with each available SCell, the BWP defining frequency resources used for uplink (UL) and downlink (DL) communications with each available SCell; and one or more processors coupled to the memory to select one or more active secondary cells (SCells) and associated BWPs to use in communications; wherein available SCells and their BWPs are added via communications with a next generation NodeB (gNodeB) by radio resource control (RRC) messaging, and wherein SCells and their BWPs are activated using initialization messaging and updated via reconfiguration messaging such that an active SCell has an active BWP determined from initialization and when a new SCell is activated via subsequent messaging, the active BWP used is a default BWP provided from initialization messaging.

In an Eleventh Example, the Tenth Example is furthered, wherein the active SCell or the BWP may be changed by subsequent downlink control information (DCI).

In an Twelfth Example, the Tenth Example is furthered, 10, wherein the active SCell may be changed by a medium access control (MAC) control element (CE).

In a Thirteenth Example, the Tenth Example is furthered, wherein when a new SCell is activated, the BWP used for the new SCell defaults to a first active BWP used for the new SCell, the first active BWP being a first BWP used for the UE with that SCell, or if never used, a value specified by the initialization signaling.

In a Fourteenth Example, the Tenth Example is furthered, wherein SCells may be activated or deactivated via RRC signaling, DCI signaling or dedicated MAC CE instruction and BWP activated via a first active BWP value stored in said memory for a particular SCell.

According to a Fifteenth Example, the Tenth Example is furthered when the UE uses new radio (NR) protocols for activating SCells and BWPs.

In a Sixteenth Example, a computer-readable medium storing executable instructions is disclosed that, in response to execution, cause one or more processors of a baseband processing circuit of a user equipment (UE) enabled with carrier aggregation (CA), to perform operations comprising: receiving a reconfiguration message from a next generation NodeB (gNB) instructing the UE to add one or more secondary cells (SCells) for carrier aggregation (CA) and a list of bandwidth parts (BWPs) to use in communicating with each one of the SCells; activating an SCell of the one or more SCells and one BWP to use for the activated SCell in response to an identifier in the reconfiguration message or a separately received MAC control element (MAC CE).

In a Seventeenth Example, the Sixteenth is furthered, wherein the list comprises a BWP index identifying each BWP for use by each SCell.

In a Eighteenth Example, the Seventeenth is furthered, wherein the BWP index is included in the separately received MAC control element.

In a Nineteenth Example, the Seventeenth is furthered, wherein the said MAC CE is of fixed size and a number of BWP index fields is a same as the number of SCell index fields.

In a Twentieth Example, the Nineteenth Example, wherein an active BWP for an active SCell reverts to a default BWP after a timer has expired.

In a Twenty-First Example, the Eighteenth is narrowed, wherein the said MAC CE is of variable size and a number of BWP index fields is a same as a number of activated SCells.

What is claimed is:

1. A baseband (BB) processor for a user equipment (UE) enabled for carrier-aggregation communication with primary cells (PCells) and secondary cells (SCells), configured to perform operations comprising:
    receiving a radio resource control (RRC) signaling from a base station to add a secondary cell (SCell), wherein the RRC signaling comprises a configuration of one or more bandwidth parts (BWPs) and an explicit indication of a first bandwidth part (BWP) of the one or more BWPs that is to be activated during activation of the SCell;
    receiving a medium access control (MAC) control element (CE) message from the base station, wherein the MAC CE message comprises an indication to activate the SCell;
    activating the SCell based on the MAC CE; and
    activating the first BWP based on the RRC signaling, upon activation of the SCell.

2. The BB processor of claim 1, wherein the RRC signaling comprises a firstActiveDownlinkBWP-Id to indicate the first BWP, when the first BWP comprises a downlink (DL) BWP.

3. The BB processor of claim 1, wherein the RRC signaling comprises a firstActiveUplinkBWP-Id to indicate the first BWP, when the first BWP comprises an uplink (UL) BWP.

4. The BB processor of claim 1, wherein the SCell that is activated or the first BWP that is activated may be changed by subsequent downlink control information (DCI).

5. The BB processor of claim 1, wherein the RRC signaling includes an IE SCellConfig to indicate the SCell to be added.

6. A base station (BS) comprising:
    a memory; and
    one or more processors coupled to the memory and configured to:
        send a radio resource control (RRC) signaling to a user equipment (UE) to add a secondary cell (SCell), wherein the RRC signaling comprises a configuration of one or more bandwidth parts (BWPs) and an explicit indication of a first bandwidth part (BWP) of the one or more BWPs that is to be activated during activation of the SCell; and
        send a medium access control (MAC) control element (CE) message to the UE, wherein the MAC CE message comprises an indication to activate the SCell.

7. The BS of claim 6, wherein the RRC signaling comprises a firstActiveDownlinkBWP-Id to indicate the first BWP, when the first BWP comprises a downlink (DL) BWP.

8. The BS of claim 6, wherein the RRC signaling comprises a firstActiveUplinkBWP-Id to indicate the first BWP, when the first BWP comprises an uplink (UL) BWP.

9. The BS of claim 6, wherein the SCell that is activated or the first BWP that is activated may be changed by subsequent downlink control information (DCI).

10. The BS of claim 6, wherein the RRC signaling includes an IE SCellConfig to indicate the SCell to be added.

11. A baseband (BB) processor for a user equipment (UE) in a wireless network capable of carrier aggregation (CA), configured to perform operations comprising:
- receiving a radio resource control (RRC) signaling from a base station to add a secondary cell (SCell), wherein the RRC signaling comprises a configuration of one or more bandwidth parts (BWPs) and an explicit indication of a first bandwidth part (BWP) of the one or more BWPs that is to be activated during activation of the SCell;
- activating the SCell for the CA, and the first BWP for communications with the SCell that is activated;
- starting a timer for the first BWP that is activated;
- performing a BWP switch to a default BWP, when the timer for the first BWP that is activated expires; and
- stopping the timer, when the SCell is deactivated.

12. The BB processor of claim 11, wherein the SCell and the first BWP are activated based on a medium access control (MAC) control element (MAC CE) message.

13. The BB processor of claim 12, wherein the MAC CE is of fixed size and includes BWP index fields and SCell index fields.

* * * * *